(12) United States Patent  
Cooper

(10) Patent No.: US 7,032,116 B2  
(45) Date of Patent: Apr. 18, 2006

(54) THERMAL MANAGEMENT FOR COMPUTER SYSTEMS RUNNING LEGACY OR THERMAL MANAGEMENT OPERATING SYSTEMS

(75) Inventor: Barnes Cooper, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 657 days.

(21) Appl. No.: 10/027,396

(22) Filed: Dec. 21, 2001

(65) Prior Publication Data

US 2003/0117759 A1 Jun. 26, 2003

(51) Int. Cl.
*G06F 1/26* (2006.01)
*G06F 1/28* (2006.01)

(52) U.S. Cl. .................................. 713/300; 713/320

(58) Field of Classification Search ............. 713/322, 713/323, 324, 300; 327/44
See application file for complete search history.

(56) References Cited

U.S. PATENT DOCUMENTS 6,112,164 A * 8/2000 Hobson .................. 702/132
6,118,306 A * 9/2000 Orton et al. ............. 327/44

* cited by examiner

*Primary Examiner*—Lynne H. Browne
*Assistant Examiner*—Stefan Stoynov
(74) *Attorney, Agent, or Firm*—Cindy T. Faatz

(57) ABSTRACT

In one embodiment of the invention, a system management interrupt (SMI) handler is invoked in response to an SMI. The SMI handler determines a thermal state of a processor. The SMI handler interacts with one of a speed step technology applet and a thermal driver in a thermal management operating system to transition the processor to one of a low power state and a high power state based on the thermal state according to a native performance control status.

30 Claims, 7 Drawing Sheets

THERMAL MANAGEMENT FOR COMPUTER SYSTEMS RUNNING LEGACY OR THERMAL MANAGEMENT OPERATING SYSTEMS

BACKGROUND

1. Field of the Invention

This invention relates to microprocessors. In particular, the invention relates to thermal management.

2. Description of Related Art

Mobile platforms have historically been faced with power and thermal management challenges due to the small form factor, limited power source availability, and relatively high power processors. Techniques have been developed to reduce processor power dissipation.

One technique is to throttle a stop clock (STPCLK#) signal to the processor. When STPCLK# signal is asserted to the processor, the processor enters a low power state such as Mobile Quick Start or stop grant. When STPCLK# is de-asserted, the processor resumes execution. Throttling using STPCLK# involves modulating STPCLK# signal at a specific frequency and duty cycle, whereby the processor operates at a reduced frequency. Throttling using STPCLK# has a number of drawbacks. First, it is complicated and requires complex external interface circuits and protocol. Second, it is not compatible with software standards in power management. Third, it is not efficient.

Therefore, there is a need to have a technique for thermal management that can overcome the above drawbacks.

BRIEF DESCRIPTION OF THE DRAWINGS

The features and advantages of the present invention will become apparent from the following detailed description of the present invention in which.

DESCRIPTION OF THE INVENTION

Figure 1:
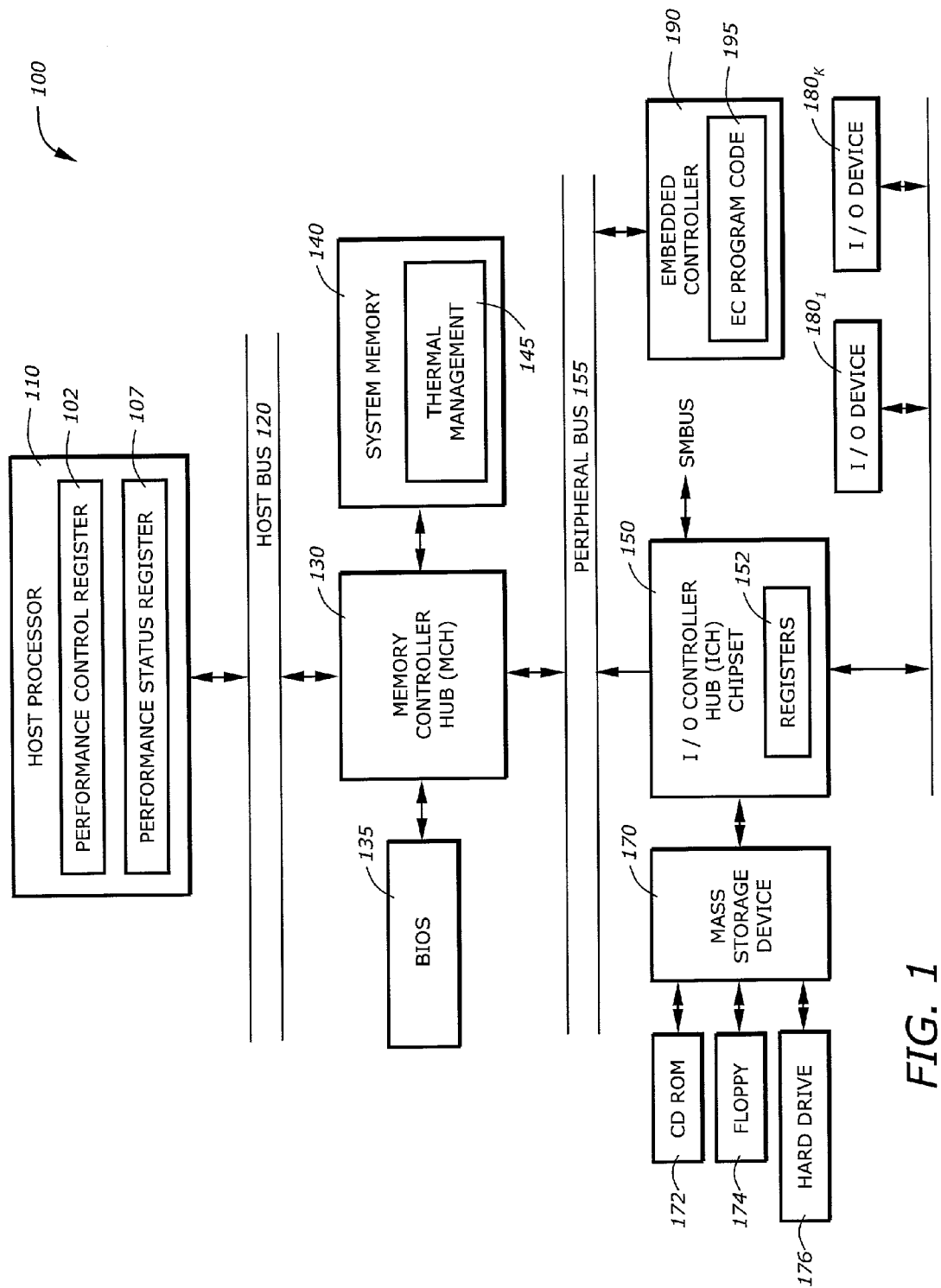
FIG. 1 is a diagram illustrating a system in which one embodiment of the invention can be practiced.

The present invention is a technique to perform thermal management on microprocessor platforms. The technique includes invoking a system management interrupt (SMI) handler in response to an SMI, determining a thermal state of a processor by the SMI handler, and interacting between the SMI handler and a speed step technology (SST) applet or a thermal driver in a thermal management operating system (OS) according to a native performance control status. The interactions transition the processor to a low power state or a high power state based on the thermal state.

In the following description, for purposes of explanation, numerous details are set forth in order to provide a thorough understanding of the present invention. However, it will be apparent to one skilled in the art that these specific details are not required in order to practice the present invention. In other instances, well-known structures are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a host processor 110, a host bus 120, a memory control hub (MCH) 130, a basic input and output system (BIOS) 135, a system memory 140, an input/output control hub (ICH) 150, a peripheral bus 155, a mass storage device 170, and input/output devices 180$_1$ to 180$_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In particular, the processor 110 includes a performance control (PERF_CTL) register 102 and a performance status register (PERF_STS) 107. The PERF_CTL register 102 allows an OS to control the processor performance by changing the bus ratio and operating voltage. The bus ratio is related to the operating frequency and the voltage is related to the power consumption. The PERF_STS register 107 stores the current bus ratio and the current voltage identifier which is used to control a voltage regulator to generate appropriate operating voltage.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the BIOS 135, system memory 140, and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The BIOS 135 stores boot-up or initialization code and data including look-up tables. The BIOS 135 is typically implemented with non-volatile memories such as flash memory, read only memory (ROM), erasable ROM, etc. The BIOS 135 or part of it may also be located internally to the MCH 130 or ICH 150.

The system memory 140 stores system code and data. The system memory 140 is typically implemented with dynamic random access memory (DRAM) or static random access memory (SRAM). The system memory may include program code or code segments implementing one embodiment of the invention. The system memory includes a thermal management module 145 which may include separate elements. Any one of the elements of the thermal management module 145 may be implemented by hardware, software, firmware, microcode, or any combination thereof. The system memory 140 may also include other programs or data which are not shown, such as an operating system. The thermal management module 145, when executed, causes the processor 110 to perform a number of tasks or operations as described later.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, registers 152, processor interface, interrupt controller, direct memory access (DMA) controller, power management logic, timer, system management bus (SMBus), universal serial bus (USB) interface, mass storage interface, low pin count (LPC) interface, etc. In one embodiment, the ICH 150 has support for ACPI operations including system management interrupt (SMI), and system control interrupt (SCI).

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The machine-readable media may contain computer readable program code to perform tasks as described in the following. These tasks may include invoking a system management interrupt (SMI) handler in response to an SMI, determining a thermal state of a processor by the SMI handler, and interacting between the SMI handler and a speed step technology (SST) applet or a thermal driver in a thermal management operating system (OS) to transition the processor to a low power state or a high power state based on the thermal state according to a native performance control status.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and any other peripheral controllers.

The embedded controller (EC) 190 is any controller such as micro-controller, digital signal processor, or any programmable device that can execute its own programs. The embedded controller 190 contains EC program code 195. The EC program code contains instructions that cause the EC 190 to perform specified operations.

Figure 2:
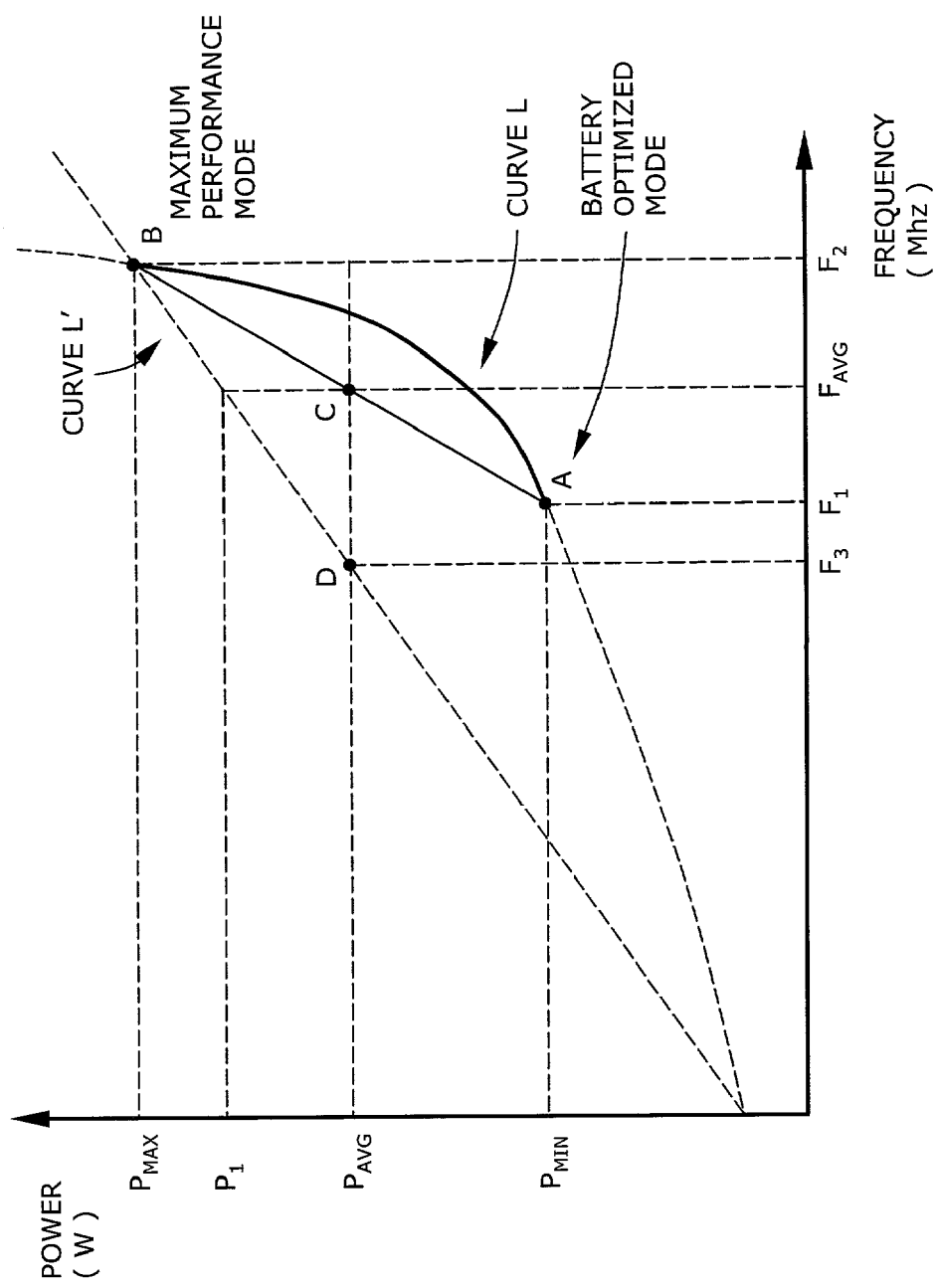
FIG. 2 is a diagram illustrating performance curves according to one embodiment of the invention.

FIG. 2 is a diagram illustrating performance curves according to one embodiment of the invention. There are two curves L and L' representing relationship between power (in Watts) and operating frequency (in MHz). The operating frequency indicates how fast a processor can run, and therefore represents the performance of the processor. Typically, the higher the frequency is, the higher the power becomes.

Curve L shows a power and frequency relationship in a realistic situation. It also represents the actual or guaranteed performance curve where the processor is guaranteed to deliver the specified performance and characteristics. It shows that within the operating range of the processor, the power and frequency are related in a non-linear fashion. The non-linear relationship may be approximated as a cubic or quadratic curve as shown from the two end points A and B. The two end points A and B define the operating region of the processor. If the processor is forced to operate beyond this region, its performance and other functional characteristics are not guaranteed. Operating point A corresponds to the lowest power consumption ($P_{min}$) and lowest performance (at frequency $F_1$). It is referred to as Battery Optimized mode where the processor is typically used with battery. Operating point B corresponds to the highest power consumption ($P_{max}$) and highest performance (at frequency $F_2$). It is referred to as Maximum Performance mode. A processor having thermal management features typically can be controlled to operate at two operating points A and B. As shown in FIG. 1, the processor 110 has the performance control register 102 which can be programmed to store control code for frequency and power, expressed as the bus ratio and voltage identifier. By controlling both the power and frequency, the power and performance can be matched accurately and the processor can be efficiently utilized.

Curve L' shows a linear relationship between power and frequency. This curve does not represent the most efficient way to use the processor. For example, using the throttling technique, when the processor operates at a high frequency, the power increases. To reduce the power, the throttling technique reduces the frequency but does not reduce the corresponding voltage which is related to the power. Therefore, the power will be only reduced approximately linearly, resulting in some wasted power.

The universal thermal management scheme in the present invention allows the processor to operate between the two operating points A and B alternately according to the thermal state of the processor. In a typical scenario, when the processor operates at the Maximum Performance mode at point B, the power is at the highest, approximately at about 100% and the temperature increases. As the processor becomes hot, there may be undesirable effects on the processor and other components in the platform. When the temperature exceeds some high threshold, the processor needs to be cooled down by switching to the Battery Optimized mode at point A. At this point, the power is significantly reduced, approximately about 50% of the maximum power, and the frequency is reduced. The temperature decreases accordingly. As the processor is cooled down, the temperature eventually goes below some low threshold. The processor is then switched back to the Maximum Performance mode again, and the process repeats. The cycling of the processor performance states between the Maximum Performance mode and the Battery Optimized mode results in an average operating point C in the middle between the two end points A and B. Operating point C has a power consumption at $P_{avg}$ and operating frequency $F_{avg}$. Although C is not on curve L, it is nonetheless corresponds to a more efficient use than the throttling technique. For example, as shown in FIG. 2, when the throttling technique is used to operating point D at power to $P_{avg}$, the corresponding operating frequency is at $F_3$, much less than $F_{avg}$. Similarly, when the throttling technique is used to put the processor at the operating frequency $F_{avg}$, the power is at $P_1$, much higher than $P_{avg}$.

Figure 3:
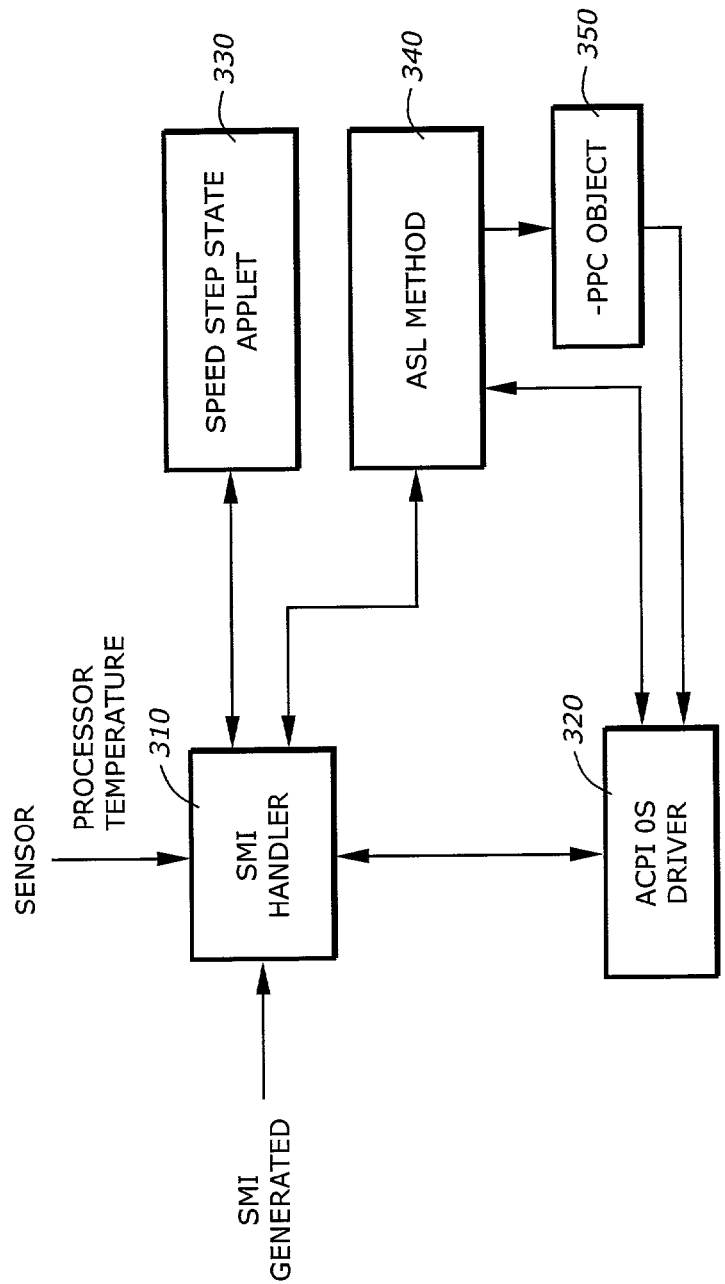
FIG. 3 is a diagram illustrating a thermal management module according to another embodiment of the invention.

FIG. 3 is a diagram illustrating the thermal management module 145 according to another embodiment of the invention. The thermal management module 145 includes an SMI handler 310, an ACPI OS driver 320, a speed step technology (SST) applet 330, an ACPI source language (ASL) method 340, and a performance present capabilities (PPC) object 350. It is noted that the thermal management module 145 may or may not be an integrated module. It may be a collection of elements from separated and independent modules. Furthermore, although the thermal management module 145 is shown to be located in the system memory 140 for illustrative purposes, some of its elements may be located in other locations such as the BIOS 135.

The SMI handler 310 is a routine to service or respond to an SMI. The SMI may be generated at predetermined intervals, periodically, or at irregular time intervals according to the thermal management policy. The SMI may be generated by a number of methods. Examples of these methods include generating SMBus cycles through the chipset (e.g., ICH 150 in FIG. 1) to an external temperature sensor, communicating with an embedded controller (e.g., the EC 190 in FIG. 1). The SMI handler 310 also receives processor temperature from a sensor. The sensor may be a physical temperature sensor or any module, element, component, or function that provides the thermal state of the processor, the platform, or the environment. The SMI handler 310 synchronizes interactions with the ACPI OS driver 320 or the SST applet 330 to transition the processor to a low power state or a high power state or keep the processor in the same power state based on the thermal state of the processor as provided by the sensor. The low power state may correspond to the Battery Optimized mode and the high power state may correspond to the Maximum Performance mode. The SMI handler 310 interacts with either the ACPI OS driver 320 or the SST applet 330 according to the status of a native performance control. The native performance control is a feature in some OS's that allows the OS to manage or control the processor performance state transitions. An OS having this feature may require the thermal management tasks be done by the OS and not by other mechanisms. When the SMI handler 310 exits, the ACPI OS takes over and processes the information as provided by the SMI handler 310.

The ACPI OS driver 320 is a component of the ACPI OS that is designed to facilitate the interactions between the SMI handler 310 and the ACPI OS. The ACPI OS driver 320 operates in accordance to the ACPI standard, published by Compaq Computer Corporation, Intel Corporation, Microsoft Corporation, Phoenix Technologies Ltd, and Toshiba Corporation, Revision 2.0, in Jul. 27, 2000. The ACPI OS driver 320 performs thermal management when the SMI handler 310 exits. Some of the tasks performed by the ACPI OS driver 320 include invoking a source language code (e.g., the ASL method 340), executing the source language code to notify a processor object of an availability status of the high power state via a performance method, object, or structure (e.g., the PPC structure 350), transitioning the processor to the low power state if the availability status is unavailable, and transitioning the processor to the high power state or keeping the processor in the same power state if the availability status is available.

The SST applet 330 is part of a software SMI handler which runs independently of the SMI handler 310. The SST applet 330 provides an efficient interface mechanism for controlling performance state transition and reporting performance states. This is accomplished by executing a number of commands or requests. The SST applet 330 functions normally while the system is in thermal over-temperature condition including transition the processor to a new performance state. This is done by caching applet requests to set the processor state through applet set state requests, and returning the cached state as the current state through get status requests. By doing so, the thermal cycling is transparent to the user and the SST applet 330 continues to function normally. The SST applet 330 provides a mechanism to receive a SST command and perform SST operations according to the SST command. These operations, among others, include: (1) returning a current processor state if the SST command is a get status command, (2) recording a requested stated if the SST command is a set state command and the thermal state corresponds to a high temperature; and (3) transitioning the processor to a last requested state and recording the current processor state if the SST command is a set state command and the thermal state corresponds to a low temperature.

The ASL method 340 is a routine or program that defines the ACPI objects including writing ACPI control methods. The ASL method 340 can be translated by a compiler to generate an ACPI machine language (AML) versions of the control methods. The ASL method 340 declares a processor object, or structure, to provide processor configuration information. These objects, or structures, serve multiple purposes including providing alternative definitions for the registers described by the processor register block (P_BLK) and processor performance state control. Examples of the processor objects include: performance present capabilities (_PPC), performance supported states (_PSS), and performance control (_PCT) to declare an interface that allows the ACPI OS to transition the processor into a performance state.

The PPC object 350 is a method that dynamically indicates to the ACPI OS the number of performance states currently supported by the platform. This method returns a number that indicates the _PSS entry number of the highest performance state that the ACPI OS can use at a given time. The ACPI OS may choose the corresponding state entry in the _PSS as indicated by the value returned by the _PPC method or any lower power (higher numbered) state entry in the _PSS.

The SMI handler 310, the ACPI OS driver 320, the SST applet 330, and the ASL method 340 operate independently. The performance states are updated or changed at several places in the software but they are kept tracked of by these modules. Therefore, these modules are in synchronization. The thermal management module 145 is universal in that it provides mechanisms to perform thermal management using SST applet 330 or OS having native performance control.

Figure 4:
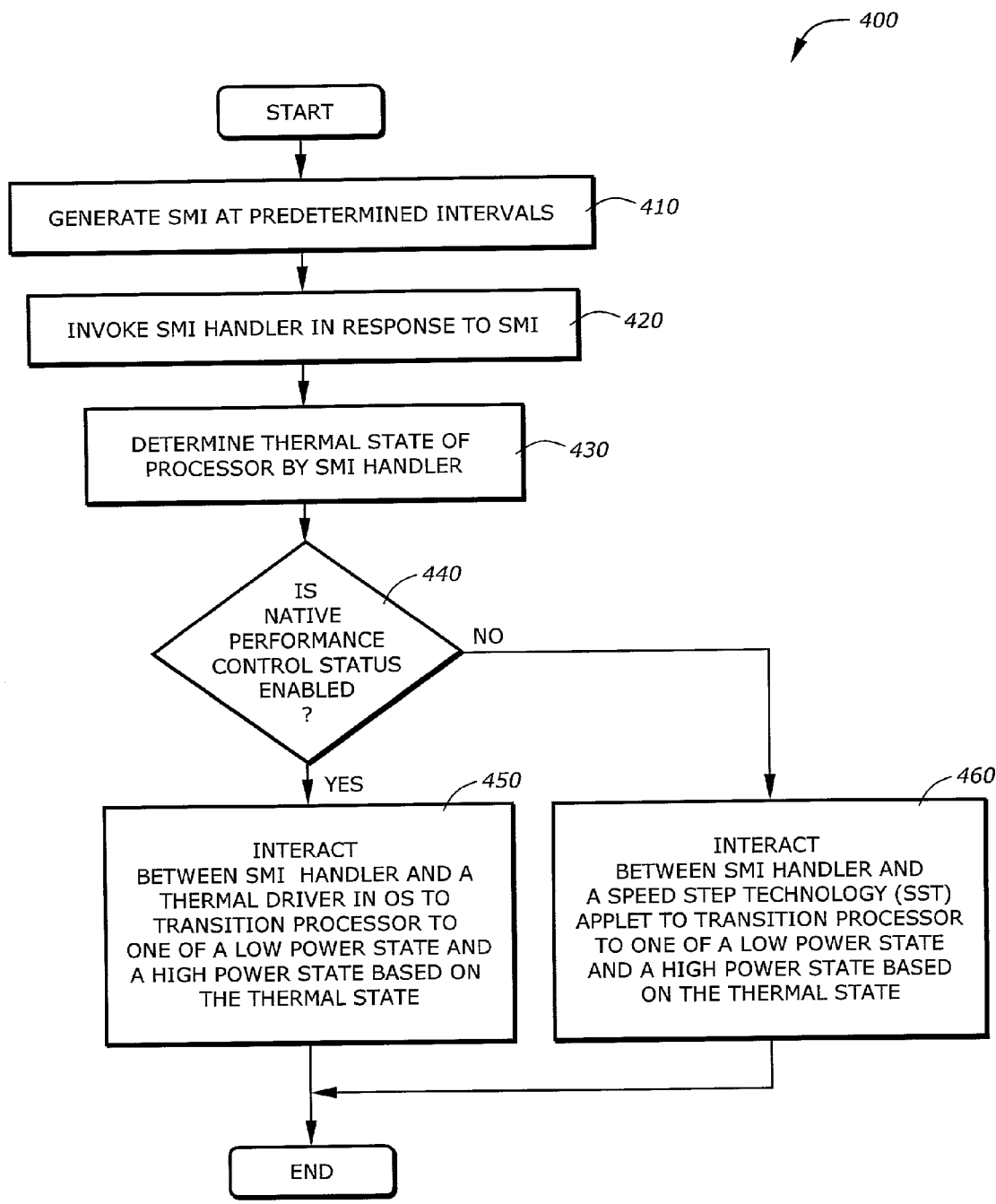
FIG. 4 is a flowchart illustrating a process for universal thermal management according to one embodiment of the invention.

FIG. 4 is a flowchart illustrating a process 400 for universal thermal management according to one embodiment of the invention.

Upon START, the process 400 generates SMI at predetermined intervals (Block 410). The SMI may be generated periodically using a timer, or in any time interval according to the thermal management policy. Then, the process 400 invokes an SMI handler in response to the SMI (Block 420). Next, the SMI handler determines a thermal state of the processor (Block 430). This can be accomplished by generating SMBus cycles to an embedded controller connected to a sensor.

Figure 5:
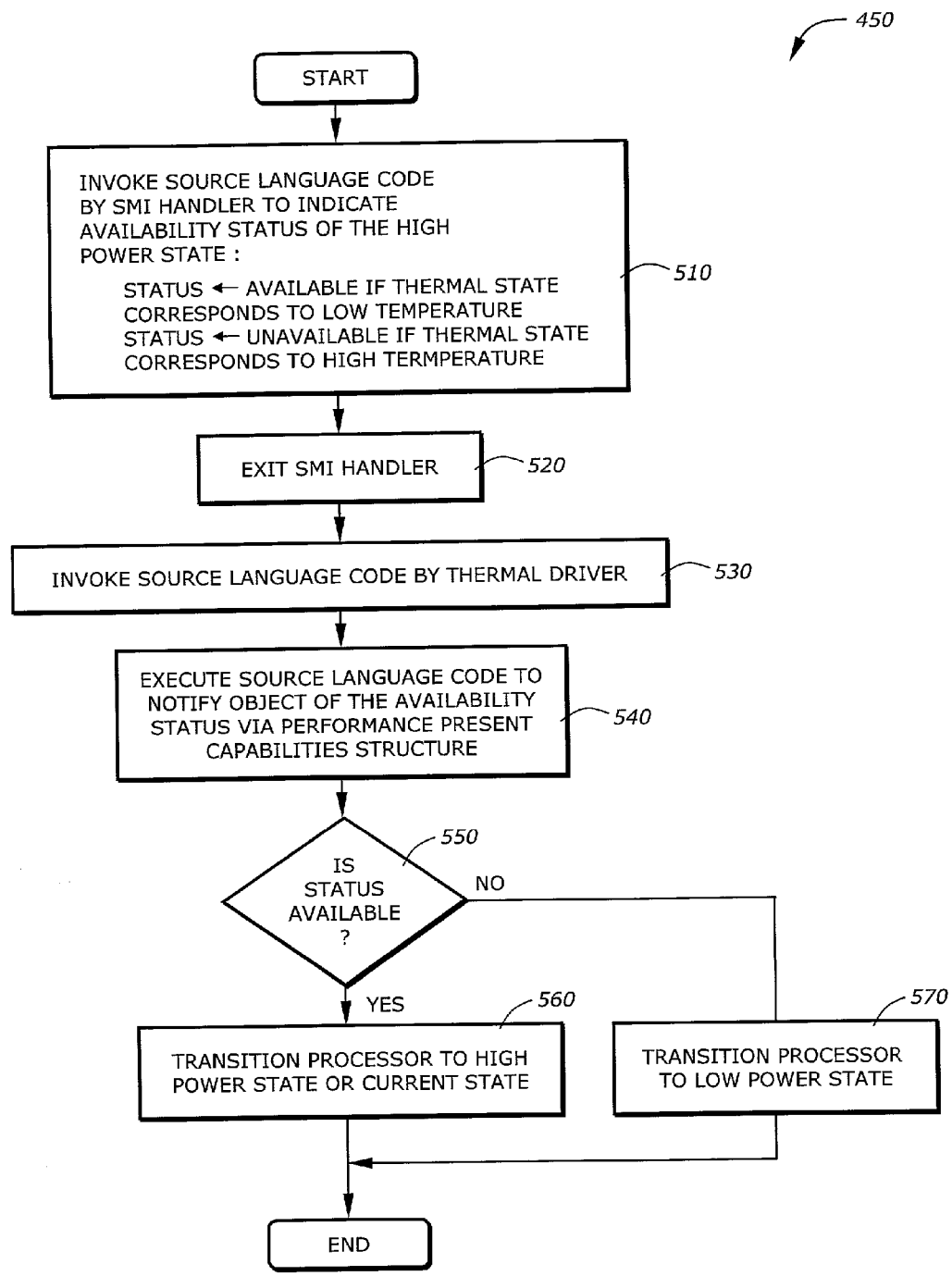
FIG. 5 is a flowchart illustrating a process to interact between an SMI handler and a thermal management operating system (OS) according to another embodiment of the invention.
Figure 6:
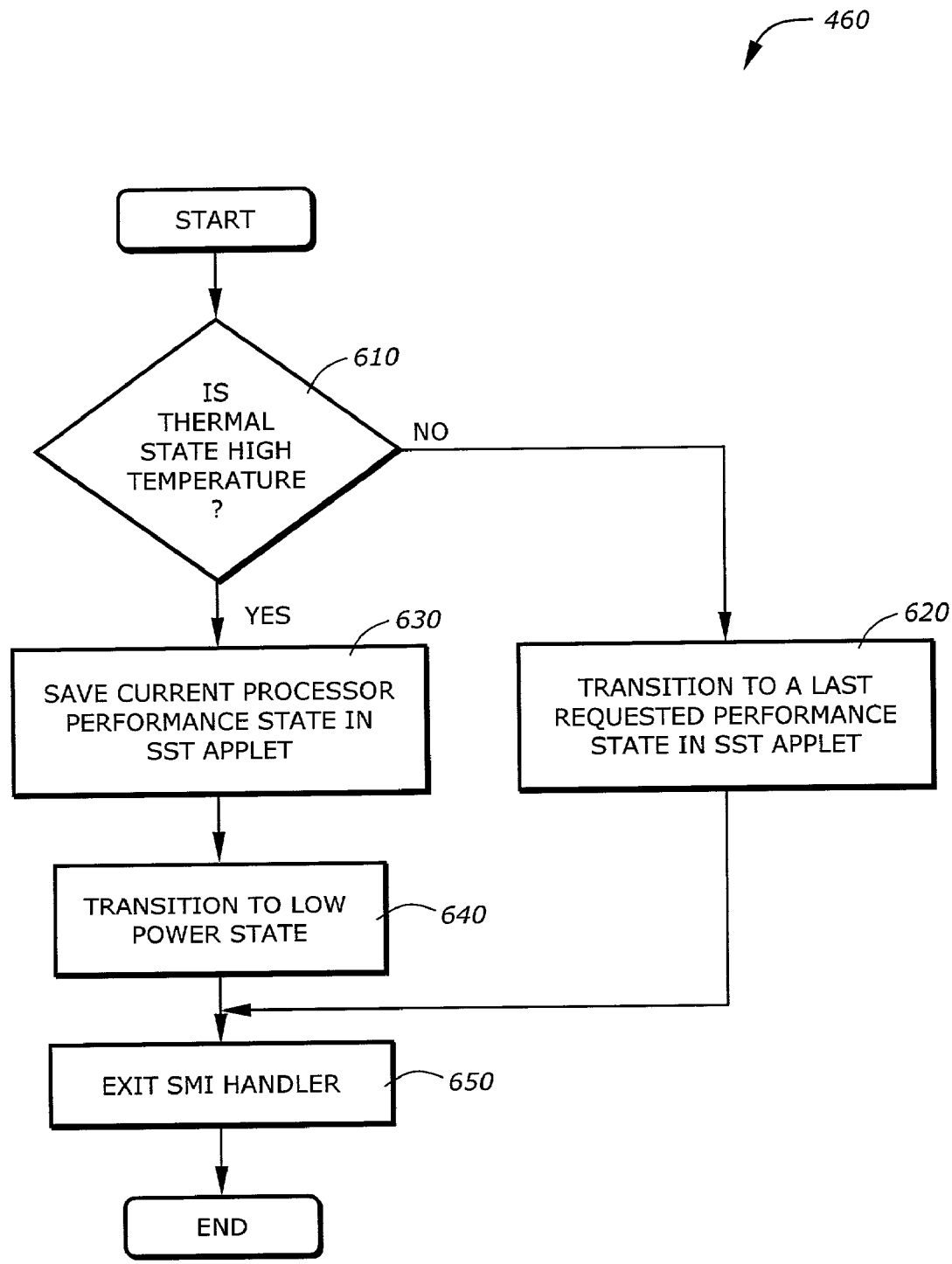
FIG. 6 is a flowchart illustrating a process to interact between an SMI handler and a speed step technology (SST) applet according to another embodiment of the invention.

Next, the SMI handler determines if the native performance control status is enabled (Block 440). This can be accomplished by checking the type of the loaded OS (e.g., version number). If the native performance control is enabled, the SMI handler interacts with the ACPI OS driver to transition the processor to a low or high power state based on the thermal state (Block 450) and is then terminated. The details of block 450 are shown in FIG. 5. Otherwise, the SMI handler interacts with the SST applet to transition the processor to a low, current, or high power state based on the thermal state (Block 460) and is then terminated. The details of block 460 are shown in FIG. 6.

FIG. 5 is a flowchart illustrating the process 450 to interact between an SMI handler and a thermal management operating system (OS) according to another embodiment of the invention.

Upon START, the SMI handler invokes a source language code (e.g., ASL method) to indicate an availability status of the high power state (e.g., the Maximum Performance state) based on the thermal state of the processor (Block 510). The status is "available" if the thermal state corresponds to a low temperature, or when the processor temperature goes below a low threshold. The status is "unavailable" if the thermal state corresponds to a high temperature, or when the processor temperature goes above a high threshold. Then the SMI handler exits (Block 520).

After the SMI handler exits, control returns to the ACPI OS. The ACPI OS executes a thermal driver in the ACPI OS. The thermal driver invokes the source language code (e.g., ASL method) which reports the status earlier by the SMI handler (Block 530). The thermal driver then executes the source language code to notify a processor object of the availability status via a performance present capabilities object (Block 540). Then, the thermal driver determines if the status is available (Block 550). If it is, the thermal driver transitions the processor to a high power state or keeps the processor in the same state (Block 560) according to the performance state as updated by other processes and is then terminated. Otherwise, the thermal driver transitions the processor to a low power state (Block 570) and is then terminated.

FIG. 6 is a flowchart illustrating the process 460 to interact between an SMI handler and a speed step technology (SST) applet according to another embodiment of the invention.

Upon START, the process 460 determines if the thermal state corresponds to a high temperature (i.e., if the processor is hot) (Block 610). If not, the process 460 transitions the processor to a last requested performance state as recorded in the SST applet (Block 620) and goes to Block 650. The performance state as recorded in the SST applet may be changed by other processes or updated at several places. The last requested state represents the state the system should be in if there is no thermal condition. Transitioning to the last requested state may mean keeping the processor in the same state or switching to a higher power state. If the thermal state corresponds to a high temperature, the process 460 saves the current processor performance state in the SST applet (Block 630). Then, the process 460 transitions the processor to the low power state (e.g., Battery Optimized state) (Block 640). Next, the process 460 exits the SMI handler (Block 650) and is then terminated.

Figure 7:
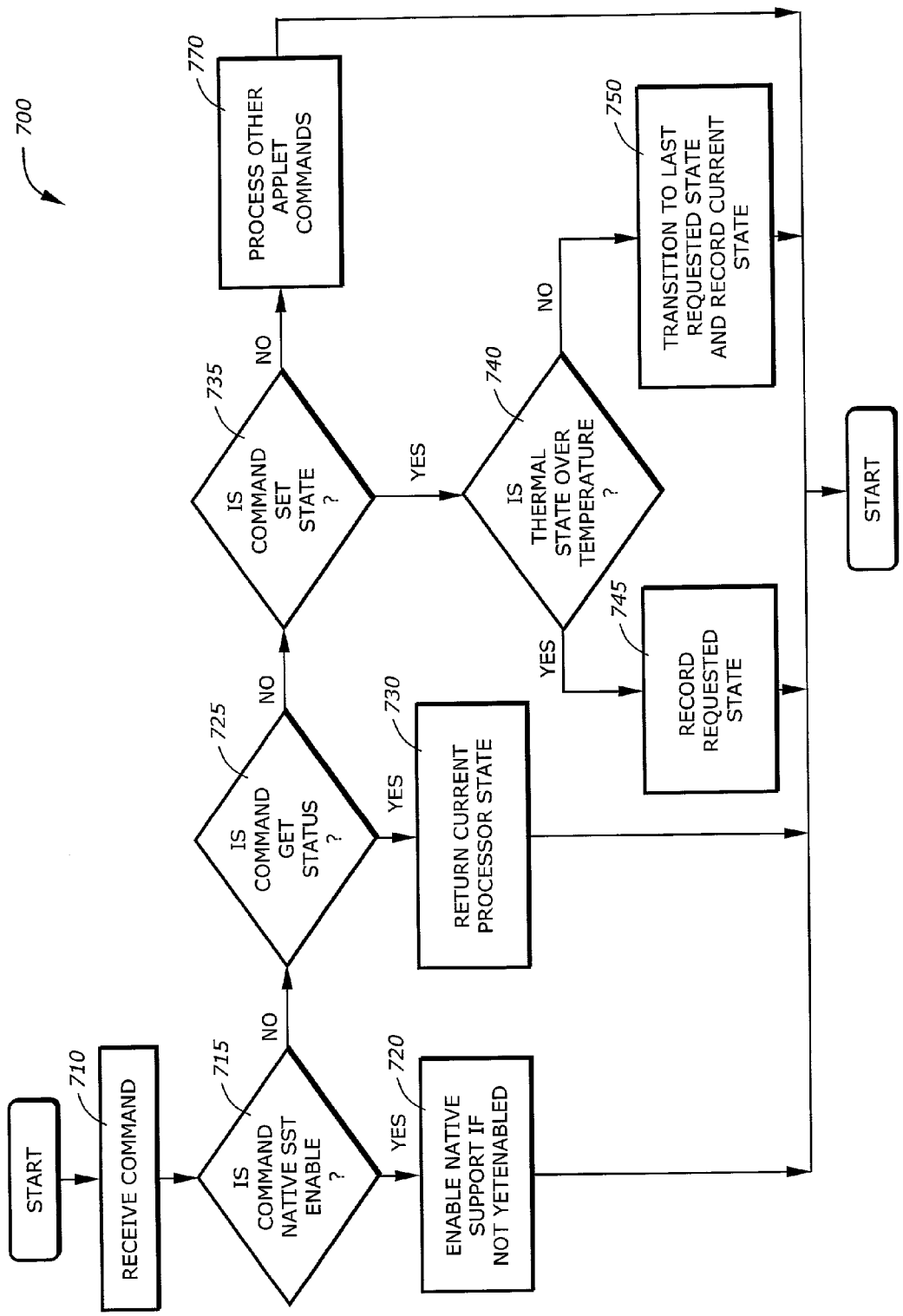
FIG. 7 is a flowchart illustrating the process 700 to process a SST command according to another embodiment of the invention.

FIG. 7 is a flowchart illustrating the process 700 to process a SST command according to another embodiment of the invention. The process 700 may be implemented by a software SMI that employs the SST applet.

Upon START, the process 700 receives a SST command (Block 710). Next, the process 700 determines if the command is a native SST command enable (Block 715). If so, the process 700 enables the native support if it is not yet enabled (Block 720) and is then terminated. Otherwise, the process 700 determines if the command is a get status command (Block 725). If so, the process 700 returns the current processor state (Block 730) and is then terminated. Otherwise, the process 700 determines if the command is a set state command (Block 735). If so, the process 700 determines if the thermal state is over temperature, i.e., whether it is above the high threshold or below the low threshold, (Block 740). If the thermal state is over temperature, the process 700 records the requested state (Block 745) and is then terminated. If the thermal state is not over temperature, the process 700 transitions the processor to the last requested state and records the current state (Block 750) and is then terminated. If the command is not a set state command, the process 700 processes the corresponding command (Block 770) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    invoking a system management interrupt (SMI) handler in response to an SMI;
    determining a thermal state of a processor by the SMI handler; and
    the SMI handler selectively interacting between one of a performance state control applet and a thermal driver in a thermal management operating system (OS) to determine whether to transition the processor to one of a low power state and a high power state based on the thermal state according to a native performance control status.

2. The method of claim 1 wherein invoking the SMI comprises:
    invoking the SMI at predetermined time intervals.

3. The method of claim 1 wherein determining the thermal state comprises:
reading a sensor indicating temperature of the processor.

4. The method of claim 1 wherein interacting comprises:
if the native performance control is enabled, interacting with the thermal management OS; and
if the native performance control is not enabled, interacting with the performance state control applet.

5. The method of claim 4 wherein interacting with the thermal management OS comprises:
invoking a source language code compatible with the thermal OS by the SMI handler, the source language code indicating availability status of the high power state based on the thermal state, the availability status being available if the thermal state corresponding to a low temperature and being unavailable if the thermal state corresponds to a high temperature;
exiting the SMI handler;
invoking the source language code by the thermal driver;
executing the source language code, the executed source language code notifying a processor object of the availability status of the high power state via a present performance capability structure; and
transition ing the processor to the low power state if the availability status is unavailable and to one of a current state and the high power state if the availability status is available.

6. The method of claim 5 wherein interacting comprises:
interacting between the SMI handler and the thermal driver in an advanced configuration and power management (ACPI) operating system (OS).

7. The method of claim 6 wherein invoking the source language code comprises:
invoking an ACPI source language code (ASL).

8. The method of claim 4 wherein interacting with the performance state control applet comprises:
transitioning the processor to a last requested performance state in the performance state control applet if the thermal state corresponds to a low temperature;
saving current processor performance state in the performance state control applet if the thermal state corresponds to a high temperature;
transitioning the processor to the low power state if the thermal state corresponds to a high temperature; and
exiting the SMI handler.

9. The method of claim 1 wherein, if interacting includes interacting between the SMI handler and the performance state control applet, the method further comprises:
processing a performance state control command using the performance state control applet.

10. The method of claim 9 wherein processing the performance state control command comprises:
returning a current processor state if the performance state control command is a get status command;
recording a requested stated if the performance state control command is a set state command and the thermal state corresponds to a high temperature; and
transitioning the processor to a last requested state and recording the current processor state if the performance state control command is a set state command and the thermal state corresponds to a low temperature.

11. A computer program product comprises:
a machine useable medium having computer program code embedded therein, the computer program product having:
computer readable program code to invoke a system management interrupt (SMI) handler in response to an SMI;
computer readable program code to determine a thermal state of a processor by the SMI handler; and
computer readable program code to cause the SMI handler to selectively interact between one of a performance state control applet and a thermal driver in a thermal management operating system (OS) to determine whether to transition the processor to one of a low power state and a high power state based on the thermal state according to a native performance control status.

12. The computer program product of claim 11 wherein the computer readable program code to invoke the SMI comprises:
computer readable program code to invoke the SMI at predetermined time intervals.

13. The computer program product of claim 11 wherein the computer readable program code to determine the thermal state comprises:
computer readable program code to read a sensor indicating temperature of the processor.

14. The computer program product of claim 11 wherein the computer readable program code to interact comprises:
computer readable program code to interact with the thermal management OS if the native performance control is enabled; and
computer readable program code to interact with the performance state control applet if the native performance control is not enabled.

15. The computer program product of claim 14 wherein the computer readable program code to interact with the thermal management OS comprises:
computer readable program code to invoke a source language code compatible with the thermal OS by the SMI handler, the source language code indicating availability status of the high power state based on the thermal state, the availability status being available if the thermal state corresponding to a low temperature and being unavailable if the thermal state corresponds to a high temperature;
computer readable program code to exit the SMI handler;
computer readable program code to invoke the source language code by the thermal driver;
computer readable program code to execute the source language code, the executed source language code notifying a processor object of the availability status of the high power state via a present performance capability structure; and
computer readable program code to transition the processor to the low power state if the availability status is unavailable and to one of a current state and the high power state if the availability status is available.

16. The computer program product of claim 15 wherein the computer readable program code to interact comprises:
computer readable program code to interact between the SMI handler and the thermal driver in an advanced configuration and power management (ACPI) operating system (OS).

17. The computer program product of claim 16 wherein the computer readable program code to invoke the source language code comprises:
computer readable program code to invoke an ACPI source language code (ASL).

18. The computer program product of claim 14 wherein the computer readable program code to interact with the performance state control applet comprises:

computer readable program code to transition the processor to a last requested performance state in the performance state control applet if the thermal state corresponds to a low temperature;
computer readable program code to save current processor performance state in the performance state control applet if the thermal state corresponds to a high temperature;
computer readable program code to transition the processor to the low power state if the thermal state corresponds to a high temperature; and
computer readable program code to exit the SMI handler.

19. The computer program product of claim 11 wherein, if interacting includes interacting between the SMI handler and a performance state control applet, the computer program product further comprises:
computer readable program code to process a performance state control command using the performance state control applet.

20. The computer program product of claim 19 wherein the computer readable program code to process the performance state control command comprises:
computer readable program code to return a current processor state if the performance state control command is a get status command;
computer readable program code to record a requested stated if the performance state control command is a set state command and the thermal state corresponds to a high temperature; and
computer readable program code to transition the processor to a last requested state and recording the current processor state if the performance state control command is a set state command and the thermal state corresponds to a low temperature.

21. A system comprising:
a processor;
a memory coupled to the processor to store a thermal management module, the thermal management module including a system management interrupt (SMI) handler and a thermal management operating system (OS), the thermal management module, when executed, causing the processor to:
invoke a system management interrupt (SMI) handler in response to an SMI,
determine a thermal state of a processor by the SMI handler, and the SMI handler to selectively interact between one of a performance state control applet and a thermal driver in a thermal management operating system (OS) to determine whether to transition the processor to one of a low power state and a high power state based on the thermal state according to a native performance control status.

22. The system of claim 21 wherein the thermal management module causing the processor to invoke the SMI causes the processor to:
invoke the SMI at predetermined time intervals.

23. The system of claim 21 wherein the thermal management module causing the processor to determine the thermal state causes the processor to:
read a sensor indicating temperature of the processor.

24. The system of claim 21 wherein the thermal management module causing the processor to interact causes the processor to:
interact with the thermal management OS if the native performance control is enabled; and
interact with the performance state control applet if the native performance control is not enabled.

25. The system of claim 24 wherein the thermal management module causing the processor to interact with the thermal management OS causes the processor to:
invoke a source language code compatible with the thermal OS by the SMI handler, the source language code indicating availability status of the high power state based on the thermal state, the availability status being available if the thermal state corresponding to a low temperature and being unavailable if the thermal state corresponds to a high temperature;
exit the SMI handler;
invoke the source language code by the thermal driver;
execute the source language code, the executed source language code notifying a processor object of the availability status of the high power state via a present performance capability structure; and
transition the processor to the low power state if the availability status is unavailable and to one of a current state and the high power state if the availability status is available.

26. The system of claim 25 wherein the thermal management module causing the processor to interact causes the processor to:
interact between the SMI handler and the thermal driver in an advanced configuration and power management (ACPI) operating system (OS).

27. The system of claim 26 wherein the thermal management module causing the processor to invoke the source language code causes the processor to:
invoke an ACPI source language code (ASL).

28. The system of claim 24 wherein the thermal management module causing the processor to interact with the performance state control applet causes the processor to:
transition the processor to a last requested performance state in the performance state control applet if the thermal state corresponds to a low temperature;
save current processor performance state in the performance state control applet if the thermal state corresponds to a high temperature;
transition the processor to the low power state if the thermal state corresponds to a high temperature; and
exit the SMI handler.

29. The system of claim 21 wherein, if the interacting includes interacting between the SMI handler and the performance state control applet, the thermal management module, when executed, further causes the processor to:
process a performance control command using the performance state control applet.

30. The system of claim 29 wherein the thermal management module causing the processor to process the performance state control command causes the processor to:
return a current processor state if the performance state control command is a get status command;
record a requested stated if the performance state control command is a set state command and the thermal state corresponds to a high temperature; and
transition the processor to a last requested state and recording the current processor state if the performance state control command is a set state command and the thermal state corresponds to a low temperature.

* * * * *

UNITED STATES PATENT AND TRADEMARK OFFICE
CERTIFICATE OF CORRECTION

PATENT NO. : 7,032,116 B2 Page 1 of 1
APPLICATION NO. : 10/027396
DATED : April 18, 2006
INVENTOR(S) : Cooper It is certified that error appears in the above-identified patent and that said Letters Patent is hereby corrected as shown below:

In column 9, at line 24, delete "transition ing" and insert --transitioning--.
In column 12, at line 50, after "performance" insert --state.--

Signed and Sealed this

Sixth Day of November, 2007

JON W. DUDAS
*Director of the United States Patent and Trademark Office*